(12) United States Patent
Zane et al.

(10) Patent No.: US 7,479,772 B2
(45) Date of Patent: Jan. 20, 2009

(54) ACTIVE CURRENT SHARING MULTIPHASE DC-DC CONVERTER

(75) Inventors: Regan A. Zane, Superior, CO (US); Dragan Maksimovic, Boulder, CO (US); Yang Zhang, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 385 days.

(21) Appl. No.: 11/364,886

(22) Filed: Feb. 27, 2006

(65) Prior Publication Data

US 2006/0239046 A1  Oct. 26, 2006

Related U.S. Application Data

(60) Provisional application No. 60/656,520, filed on Feb. 25, 2005.

(51) Int. Cl.
*G05F 1/00* (2006.01)
(52) U.S. Cl. ........................ 323/272; 323/283
(58) Field of Classification Search ................ 323/272, 323/283
See application file for complete search history.

(56) References Cited

U.S. PATENT DOCUMENTS

| 5,521,809 | A  | * | 5/1996 | Ashley et al. | .................. 363/71 |
| 6,574,124 | B2 | * | 6/2003 | Lin et al. | ....................... 363/65 |
| 7,235,957 | B2 | * | 6/2007 | Yang | ........................... 323/272 |
| 7,249,267 | B2 | * | 7/2007 | Chapuis | ....................... 713/300 |

OTHER PUBLICATIONS

Patella, B.J.; Prodic, A.; Zirger, A.; Maksimovic, D.; "High-frequency digital PWM controller IC for DC-DC converters," IEEE Transactions on Power Electronics, vol. 18, Issue 1, Jan. 2003, pp. 438-446.
Lee, F.C.; Xunwei Zhou, "Power management issues for future generation microprocessors," Power Semiconductor Devices and ICs, 1999, ISPSD 1991, The 11th International Symposium on Proceedings, May 26-28, 1999, pp. 27-33.
Intel research and development document, "VRM 8.3 DC-DC Converter Design Guidelines," available at intel.com, Mar. 1999.
Intel research and development document, "VRM 9.0 DC-DC Converter Design Guidelines," available at intel.com, Apr. 2002.
Intel research and development document, "Voltage Regulator Module (VRM) and Enterprise Voltage Regulator-Down (EVRD) 10.0 design guidelines," available at intel.com, Jun. 2004/Updated Jun. 2005.

(Continued)

*Primary Examiner*—Shawn Riley
(74) *Attorney, Agent, or Firm*—Hensley Kim & Holzer, LLC

(57) ABSTRACT

A converter module for use as a phase in a multiphase DC-DC converter having a data bus for transferring current-sharing information is provided. The converter module includes a power stage and a controller. The power stage comprises an input for receiving an input voltage and an output for providing an output voltage and an output current. The controller is coupled to the power stage to receive a feedback signal from the power stage. The controller further comprises a data bus port configured to receive the current-sharing information from the data bus and provide updated current-sharing information to the data bus.

62 Claims, 14 Drawing Sheets

OTHER PUBLICATIONS

Zhang, M.T.; Jovanovic, M.M.; Lee, F.C., "Design considerations for low-voltage on-board DC/DC modules for next generations of data processing circuits," IEEE Transactions on Power Electronics, vol. 11, Issue 2, Mar. 1996, pp. 328-337.

Redl, Richard; Erisman, Brian; Zansky, Zoltan, "Optimizing the load transient response of the buck converter," APEC 1998. Conference Proceedings 1998, Thirteenth Annual, vol. 1, Feb. 15-19, 1998, pp. 170-176.

Xunweizhou; Pit-Leong Wong; Peng Xu; Lee, F. C.; Huang, A.Q., "Investigation of candidate VRM topologies for future microprocessors," IEEE Transactions on Power Electronics, vol. 15, Issue 6, Nov. 2000, pp. 1172-1182.

Panov, Yuri; Jovanovic, Milan M., "Design considerations for 12-V/1.5-V, 50-A voltage regulator modules," IEEE Transactions on Power Electronics, vol. 16, No. 6, Nov. 2001, pp. 776-783.

Pit-Leong Wong; Lee, F.C.; Peng Xu; Kaiwei Yao, "Critical inductance in voltage regulator modules," IEEE Transactions on Power Electronics, vol. 17, Issue 4, Jul. 2002, pp. 485-492.

Peterchev, A.V.; Sanders, S.R., "Low conversion ratio VRM design," Power Electronics Specialists Conference, 2002, vol. 4, Jun. 23-27, 2002, pp. 1571-1575.

Panov, Y.; Jovanovic, M.M.; "Stability and dynamic performance of current-sharing control for paralleled voltage regulator modules," IEEE Transactions on Power Electronics, vol. 17, Issue 2, Mar. 2002, pp. 172-179.

Shiguo Luo; Zhihong Ye; Ray-Lee Lin; Lee, F.C., "A classification and evaluation of paralleling methods for power supply modules," Power Electronics Specialists Conference, 1999, 30th Annual IEEE, vol. 2, Jun. 27 - Jul. 1, 1999, pp. 901-908.

Moussaoui, Z.; Batarseh, I.; Lee, H.; Kennedy, C., "An overview of the control scheme for distributed power systems," Southcon/96, Conference Record, Jun. 25-27, 1996, pp. 584-591.

Peterchev, A.V.; Jinwen Xiao; Sanders, S.R., "Architecture and IC implementation of a digital VRM controller," Power Electronics Specialists Conference, 2001, IEEE 32nd Annual, vol. 1, Jun. 17-21, 2001, pp. 38-47.

Panov, Y.; Rajagopalan, J.; LEE, F.C., "Analysis and design of N paralleled DC-DC converters with master-slave current-sharing control," Applied Power Electronics Conference and Exposition, 1997, APEC 1997 Conference Proceedings, Twelfth Annual, vol. 1, Feb. 23-27, 1997, pp. 436-442.

Tomescu, B.; Van Landingham, H.F., "Improved large signal performance of paralleled DC-DC converters current sharing using fuzzy logic control," Applied Power Electronics Conference and Exposition, 1998, APEC 1998, Conference Proceedings, Thirteenth Annual, vol. 2, Feb. 15-19, 1998, pp. 867-873.

Guo Guoyong; Shi Bingxue, "Design of multi-phase DC-DC converter with master-slave current sharing control," Conference on Computers, Communications, Control and Power Engineering, vol. 3, Oct. 28-31, 2002, pp. 1990-1993.

Rajagopalan, J.; Xing, K.; Guo, Y.; Lee, F.C.; Manners, B., "Modeling and dynamic analysis of paralleled DC/DC converters with master-slave current sharing control," Applied Power Electronics Conference and Exposition, 1996, APEC 1996, Conference Proceedings, Eleventh Annual, vol. 2, Mar. 3-7, 1996, pp. 678-684.

Peng Li; Lehman, B., "A design method for paralleling current mode controlled DC-DC converters," Power Electronics, IEEE Transaction on, vol. 19, Issue 3, May 2004, pp. 748-756.

Thottuvelil, V.J.; Verghese, G.C., "Analysis and control design of paralleled DC/DC converters with current sharing," Power Electronics, IEEE Transactions on, vol. 13, Issue 4, Jul. 1998, pp. 635-644.

Jenn-Jong Shieh, "Peak-current-mode based single-wire current-share multimodule paralleling DC power supplies," Circuits and Systems I: Fundamental Theory and Applications, IEEE Transactions on , vol. 50, Issue 12, Dec. 2003, pp. 1564-1568.

Chang-Shiarn Lin; Chern-Lin Chen, "Single-wire current-share paralleling of current-mode-controlled DC power supplies," Industrial Electronics, IEEE Transactions on, vol. 47, Issue 4, Aug. 2000, pp. 780-786.

Jovanovic, M.M.; Crow, D.E.; Lieu Fang-Yi, "A novel, low-cost implementation of "democratic" load-current sharing of paralleled converter modules," Power Electronics, IEEE Transactions on, vol. 11, Issue 4, Jul. 1996, pp. 604-611.

Intersil Americas Inc., ISL6580 datasheet, Sep. 2003, FN9060.2, Copyright 2003, Intersil Americas Inc.

Capponi. G.; Minneci, L.; Librizzi, F.; Scalia, P., "Multiphase voltage regulator module with transient step changing phases," Power System Technology 2000, Proceedings, PowerCon 2000, International Conference on, vol. 1, Dec. 4-7, 2000, pp. 463-467.

Zhang, Y.; Zane, R.; Maksimovic, D., "Current sharing in digitally controlled masterless multiphase DC-DC converters," in process, PESC 2005.

Yang Zhang; Zane, R.; Maksimovic, D.; Prodic, A., "On-line calibration of lossless current sensing," Applied Power Electronics Conference and Exposition, 2004, APEC 2004, Nineteenth Annual IEEE, vol. 2, 2004, pp. 1345-1350.

Yang Zhan; Zane, R.; Prodic, A.; Erickson, R.; Maksimovic, D., "Online calibration of MOSFET on-state resistance for precise current sensing," Power Electronics Letters, IEEE, vol. 2, Issue 3, Sep. 2004, pp. 100-103.

Wu, R.H.; Kohama, T.; Kodera, Y.; Ninomiya T.; Ihara, F., "Load-current-sharing control for parallel operation of DC-to-DC converters," Power Electronics Specialists Conference, 1993, PESC '93 Record, 24th Annual IEEE, Jun. 20-24, 1993, pp. 101-107.

Iu, H.H.C.; Tse, C.K., "Bifurcation in parallel-connected buck converters under a democratic current sharing scheme," Industrial Electronics, 2001 Proceedings, ISIE 2001, IEEE International Symposium on, vol. 3, Jun. 12-16, 2001, pp. 2118-2123.

Siri, K.; Banda, J., "Analysis and evaluation of current-sharing control for parallel-connected DC-DC converters taking into account cable resistance," Aerospace Applications Conference, 1995 Proceedings, 1995 IEEE, Issue 0, Feb. 4-11, 1995, pp. 29-48.

Lee, C.Q.; Siri, K.; Wu, T.F., "Dynamic current distribution controls of a parallel connected converter system," Power Electronics Specialists Conference, 1991 PESC Record, 22nd Annual IEEE, Jun. 24-27, 1991, pp. 875-881.

Wu, T.F.; Siri, K.; Banda, J., "The central-limit control and impact of cable resistance in current distribution for parallel-connected DC-DC converters," Power Electronics Specialists Conference, PESC 1994 Record, 25th Annual IEEE, Jun. 20-25, 1994, pp. 694-702.

Ramos, R.; Biel, D.; Guinjoan, F.; Fossas, E., "Sliding mode design of distributed central limit control strategy for parallel-connected inverters," Power Electronics Congress, 2002 Technical Proceedings, CIEP 2002, VIII IEEE International, Oct. 20-24, 2002, pp. 197-201.

Peterchev, A.V.; Jinwen Xiao; Sanders, S.R., "Architecture and IC implementation of digital VRM controller," Power Electronics, IEEE Transactions on, vol. 18, Issue 1, Jan. 2003, pp. 356-364.

Saggini, S.; Ghioni, M.; Geraci, A., "An innovative digital control architecture for low-voltage, high-current DC-DC converters with tight voltage regulation," Power Electronics, IEEE Transactions on, vol. 19, Issue 1, Jan. 2004, pp. 210-218.

Wenkang Huang; Schuellein, G.; Clavette, D., "A scalable multiphase buck converter with average current share bus," Applied Power Electronics Conference and Exposition 2003, 18th Annual IEEE, vol. 1, Feb. 9-13, 2003, pp. 438-443.

Primarion PX3539, VR114-phase Digital PWM Controller, Product Brief, Oct. 24, 2005, 7 pgs., Copyright 2005, Primarion, Inc.

* cited by examiner

Competing loops (A)

(B) Simulation for competing loops (A)

Simulation with advanced controls (B)

ACTIVE CURRENT SHARING MULTIPHASE DC-DC CONVERTER

CROSS-REFERENCE TO RELATED APPLICATIONS

This application claims the benefit of U.S. provisional application No. 60/656,520 entitled "A masterless multiphase architecture for DC-DC converters with active current sharing" and filed by Regan Zane et al. on 25 Feb. 2005, which is hereby incorporated by reference as though fully set forth herein.

BACKGROUND a. Field of the Invention

The instant invention relates to active current sharing in a multiphase DC-DC converter.

b. Background

Power supplies for high performance microprocessors often must deliver low supply voltages with high currents while maintaining tight output voltage regulation in the presence of large load transients. Interleaved multiphase converters have been used in such systems due to advantages, such as lower switching frequencies for each phase, total current division among the phases, fast transient response, and use of smaller active and passive components. Multiphase converters, however, generally require additional circuitry to ensure appropriate current sharing and phase shifting between the phases.

Many analog approaches have been used to achieve current sharing. "Master-slave" schemes, for example, include a converter that operates as a master converter to regulate the current of that converter and other slave converters via a reference signal. "Democratic" or "autonomous" schemes have also been used in which multiple converters are connected to an analog sharing line to produce a current reference and the individual converters are controlled to match their output currents to the current reference. "Central-limit" schemes utilize a central controller to provide a current error of each phase relative to the average load current. In each of these approaches, however, the master must receive information from each phase. This results in a delay in the controller while information is transferred and requires dedicated traces to each phase (resulting in a relatively large board area) and a communication protocol so that information can be through the phases or across a shared bus (e.g., a CAN bus, a daisy-chain, etc.).

Digital control approaches have also been proposed for multiphase converters in order to provide for increased design flexibility and programmability, immunity to analog component variations, ease of integration with other digital systems, and the ability to implement more advanced control schemes. Previously proposed digital control approaches, however, have been based on a master digital controller in which one of the digital controllers (or another dedicated digital controller that is not part of a phase) operates as a master controller to regulate the current of that converter and other slave via a reference signal. In each of these cases, however, a relatively large area of a PC board and number of hard wired communications configurations between the phases and/or the dedicated master and the phases.

BRIEF SUMMARY

In one embodiment, a converter module for use as a phase in a multiphase DC-DC converter having a data bus for transferring current-sharing information is provided. The converter module comprises a power stage and a controller. The power stage comprises an input for receiving an input voltage and an output for providing an output voltage and an output current. The controller is coupled to the power stage to receive a feedback signal from the power stage. The controller further comprises a data bus port configured to receive the current-sharing information from the data bus and provide updated current-sharing information to the data bus. The controller is also configured to: (1) determine a current level being provided by said power stage, (2) update the current-sharing information based upon the determined current level, (3) determine a current error based upon the determined current level and the updated current-sharing information, (4) control an operation of said power stage based upon the current error, and (5) provide the updated current-sharing information to the data bus.

In another embodiment, a multiphase DC-DC power converter comprises a first phase, a second phase, and a data bus. The first phase comprises a first power stage and a first controller configured to control an operation of the first power stage. The second phase comprises a second power stage and a second controller configured to control an operation of the second power stage. The data bus is coupled to the first controller and the second controller. The first controller is further configured to receive first current-sharing information via the data bus, update the first current-sharing information to obtain second current-sharing information, and provide the second current-sharing information to the data bus. The second controller is further configured to receive the second current-sharing information from the data bus, to update the second current-sharing information to obtain third current-sharing information, and to provide the third current-sharing information to the data bus.

In yet another embodiment, a method of sharing current information between phases of a multiphase DC-DC converter is provided. The method comprises: (1) receiving a first current-sharing information at a first phase via a data bus; (2) updating the first current-sharing information based upon current information of the first phase to obtain a second current-sharing information; (3) providing the second current-sharing information to the data bus; (4) receiving the second current-sharing information at a second phase via the data bus; (5) updating the second current-sharing information based upon current information of the second phase to obtain a third current-sharing information; and (6) providing the second current-sharing information to the data bus.

The foregoing and other aspects, features, details, utilities, and advantages of the present invention will be apparent from reading the following description and claims, and from reviewing the accompanying drawings.

DETAILED DESCRIPTION

Multiphase DC-DC Converter

Figure 1:
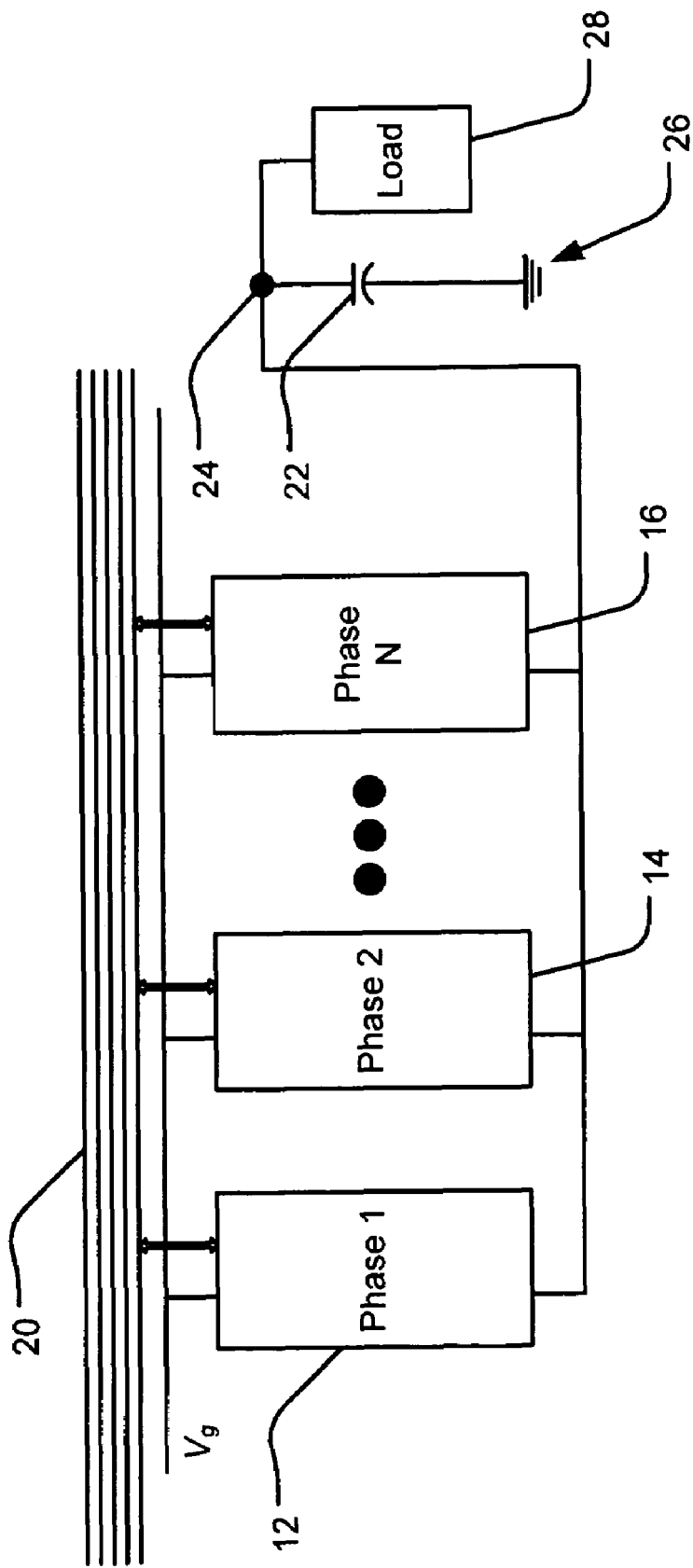
FIG. 1 shows a block diagram of an exemplary multiphase DC-DC converter for controlling current sharing between multiple phases of the converter.

FIG. 1 shows a block diagram of an exemplary multiphase DC-DC converter 10 for controlling current sharing between multiple phases of the converter. In this embodiment, the converter 10 comprises N individual interleaved phases 12, 14, and 16, a digital bus 20, and an output capacitor 22 applied in parallel across a pair of output terminals 24 and 26 of the converter 10. The multiphase DC-DC converter 10 supplies a regulated output voltage $V_{out}$ and an output current $I_{out}$ to a load 28. The exemplary multiphase DC-DC converter 10 shown in FIG. 1 may comprise any number of two or more interleaved phases (i.e., N may comprise any positive integer greater than one).

Each of the individual interleaved phases 12, 14, and 16 comprises a power stage (e.g., a DC-DC converter), a digital controller, and analog-digital interface components (i.e., analog-to-digital (A/D) converters and/or digital-to-analog (D/A) converters). The digital controller, for example, may be implemented in (1) any number of hardware implementations using custom digital logic, such as in digital logic implemented on one or more programmable logic chips (e.g., a field-programmable gate array (FPGA) or complex programmable logic devices (CPLD)), application specific integrated circuits (ASIC), or custom digital or mixed-signal controller chips; (2) any number of software implementations, such as using microcontrollers, microprocessors, or digital signal processors (DSP) that execute instructions written as software code in an implementation, or (3) a combination of hardware and software implementations.

In one embodiment, for example, individual modules may comprise each component of an individual interleaved phase 12, 14, or 16 (e.g., a power stage, a digital controller, and analog-digital interfaces) thus allowing for a scalable approach in which the multiphase DC-DC converter 10 comprises a single module for each interleaved phase. In this embodiment, the configuration allows for a scalable implementation in which the individual modules can be used to select any number of interleaved phases for a particular DC-DC converter 10. Alternatively, an individual module may comprise any number of individual interleaved phases (e.g., two or three interleaved phases per module) and the DC-DC converter 10 may be scalable in factors of N individual phases by adding or removing individual modules. In another embodiment, each of the individual interleaved phases may be implemented via a single module (with or without a bus and/or an output capacitor) with either a pre-selected number of phases or a selectable number of phases (e.g., programmably or dynamically selectable). In yet another embodiment, the DC-DC converter may be implemented using discrete components or any number or combination of components as one skilled in the art would readily understand from the scope of this disclosure.

Figure 2:
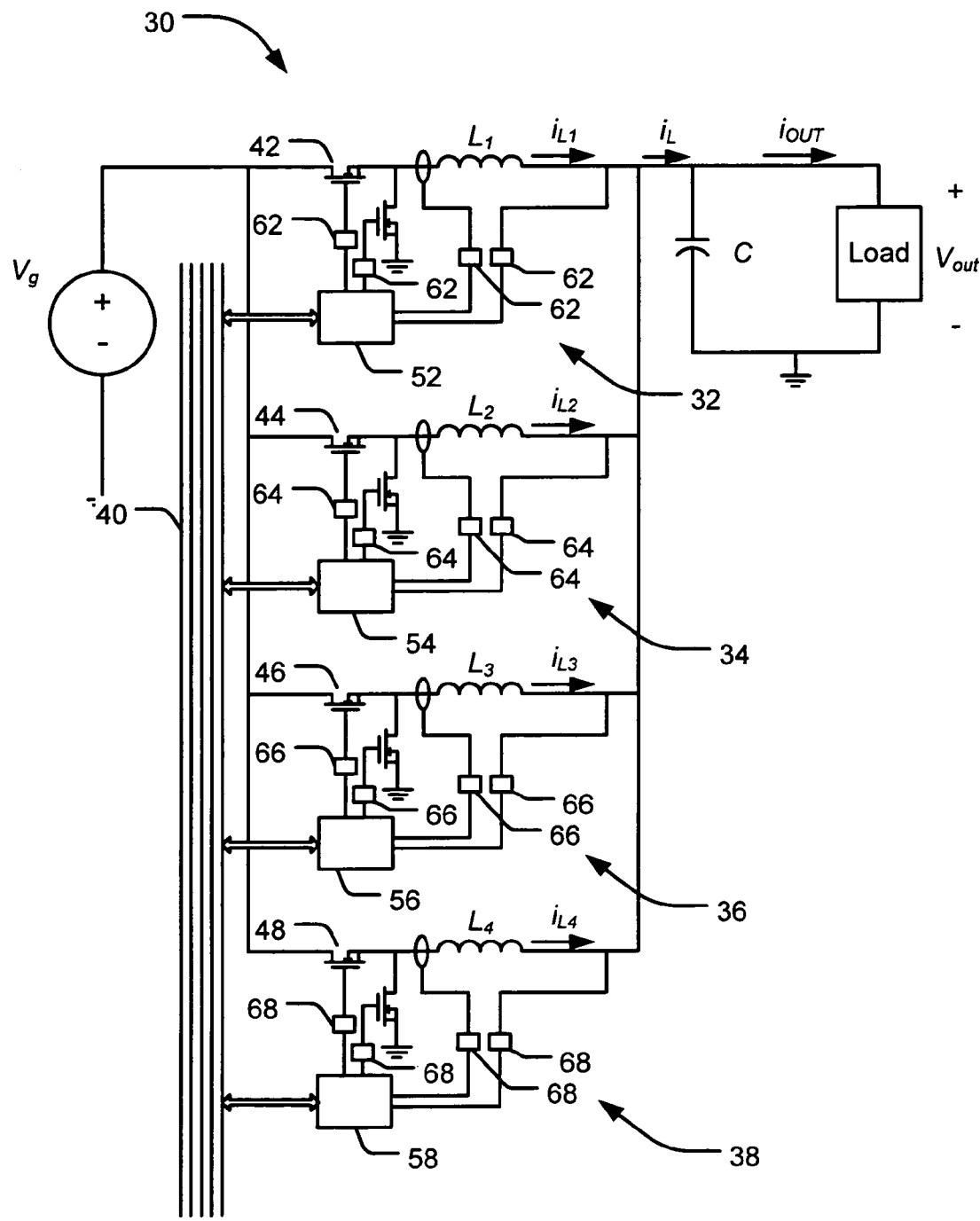
FIG. 2 shows a block diagram of a second exemplary multiphase DC-DC converter for controlling current sharing between multiple phases of the converter.

FIG. 2 shows an exemplary implementation of the embodiment of the DC-DC converter shown in FIG. 1. In this implementation, a DC-DC converter 30 comprises four individual interleaved phases 32, 34, 36, and 38, a digital bus 40, and an output capacitor 42 disposed in parallel across a pair of output terminals 44 and 46 of the converter 30. The multiphase DC-DC converter 30 supplies a regulated output voltage $V_{out}$ and an output current $I_{out}$ to a load 48. While the example shown in FIG. 2 shows four individual interleaved phases, any number of at least two interleaved phases may be used.

Each of the individual interleaved phases 32, 34, 36, and 38 in this implementation comprises a synchronous rectifier buck converter power stage 42, 44, 46, and 48, a digital controller 52, 54, 56, and 58 and corresponding analog-digital interface components 62, 64, 66, and 68, respectively. While buck converters are shown in FIG. 2, other DC-DC converters, such as boost converters, boost-buck converters, inverting converters, half-bridge or full-bridge switching converters, multi-level switching converters, isolated converters derived from any of the above, or the like, may be used.

Current Sharing Control

The interleaved phases of the DC-DC converter each utilize the digital data bus to receive current-sharing information related to the current level being provided by at least one other interleaved phase and to provide current-sharing information related to the current level being provided by that particular phase. The current-sharing information is a function of the current level being provided by at least one individual interleaved phase of the DC-DC converter. The current-sharing information placed on and/or received from the digital data bus, for example, may comprise collective current-sharing information of a plurality of individual interleaved phases (e.g., an average output current level of at least two interleaved phases or a function of the average output current level) or individual current-sharing information for a particular individual interleaved phase (e.g., an individual output current level of a single interleaved phase or a function of the individual output current level).

Chain Control Algorithm

In one embodiment, for example, a chain-control algorithm may be used to calculate a moving-window average of each individual interleaved phase of the converter. This moving-window average, for example, may be used in each individual interleaved phase to control the output current of that phase to be equal to (or to substantially follow) the average current of each of the individual interleaved phases. This, for example, would prevent any of the phases from reaching saturation or having excessive current, voltage, or thermal stresses due to an uneven sharing of the output current of the converter. In this embodiment, each individual interleaved phase in sequence receives a moving-window average of the output currents of the individual interleaved phases from the digital data bus, modifies the moving-window average to take into account the output current level of that phase, and provides the modified moving-window average back to the digital data bus. The next individual interleaved phase then receives this modified moving-window average from the digital data bus, modifies the moving-window average to take into account its output current level, and provides this new moving-window average to the digital data bus. The remaining individual interleaved phases then repeat this process in sequence. Each of the individual interleaved phases further uses this moving-window average current level to control its own output current level.

The chain-control algorithm may perform a moving-window average over any number of windows, such as for one or more switching cycles for each of the individual interleaved phases. Thus, the algorithm may allow the individual interleaved phases to control their current during both steady-state and transient conditions of the DC-DC converter. By performing the calculations in each phase instead of in a master phase, which then must communicate the information to each individual interleaved phase, the converter is able to minimize its required internal communication data rate and processing overhead.

In a system having four individual interleaved phases, such as where N=4 in the converter shown in FIG. 2, for example, each of the individual interleaved phases operate and sample their output current levels to determine a moving-window average in sequence. In this example, an output current of an $n^{th}$ switching cycle of each phase can be depicted as $I[1][n]$, $I[2][n]$, $I[3][n]$, and $I[4][n]$ for the first, second, third, and fourth interleaved phases, respectively. In this example, the moving-window average current level $I_{ave}[i]$ comprises the average of the four most recent output current levels of the individual interleaved phases such that the average current comprises:

$$I_{ave}[i]=I_{ave\_prev}-I[i][n-1]/N+I[i][n]/N,$$

where $I_{ave\_prev}$ is the average current level determined by the previous phase. Thus, in this particular implementation, the new moving-window average determined for each phase comprises the previous average received from the prior phase via the digital data bus minus the previous contribution to the moving-window average of that phase plus the new contribution of that phase. While the example described above calculates a moving-window average over a single switching-cycle, a similar moving-window average may be extended to include current-sharing information of more than one switching cycle.

Figure 3:
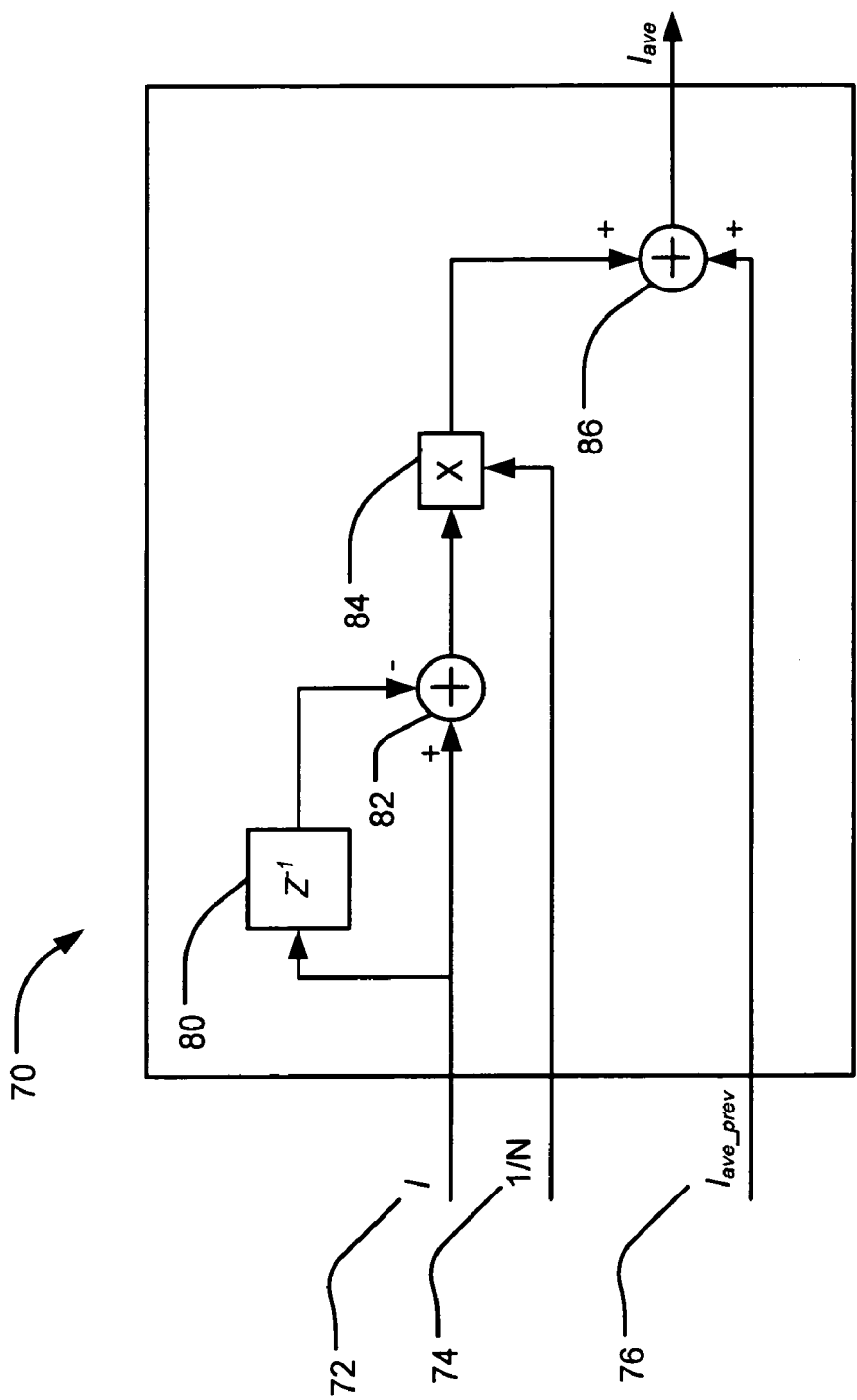
FIG. 3 shows a digital implementation of an exemplary chain control algorithm that may be used to control current sharing between multiple phases of a multiphase DC-DC converter.

FIG. 3 shows a digital implementation 70 that may be used within a controller of an individual interleaved phase of the converter to calculate the moving-window average of the chain-control algorithm. The digital implementation 70 comprises an output current level input 72 that receives a feedback output current level from the power stage of the phase, a 1/N input 74 that receives the inverse of the number of phases N in the converter, a previous moving-window average input 76 that receives the previous moving-window average current level from the previous individual interleaved phase via the digital data bus, and provides a modified moving-window average current level output 78 for providing the modified moving-window average current level to the digital data bus for use by the next individual interleaved phase. The output current level input 72 is provided to a delay block ($Z^{-1}$) 80 (e.g., a latch) and to a summing node 82. The output of the delay block ($Z^{-1}$) 80 is provided to an inverting input of the summing node 82 so that the prior output current level of the phase being held in the delay block ($Z^{-1}$) 80 is subtracted from the present output current level. The output of the summing node 82 is then provided to a multiplier 84 where the difference is multiplied by the inverse of the number of phases of the converter received at the 1/N input 74. This product is then provided to a summing node 86 where it is added to the previous moving-window average input $I_{ave\_prev}$ received from the digital data bus at the previous moving-window average input 76. The sum $I_{ave}$ provided from this summing node 86 is provided to the modified moving-window average current level output 78.

The modified moving-window average current level $I_{ave}$ can be used within the individual interleaved phases in different ways depending on the control method used to control the power stage of the phase. If the phase utilizes an analog current mode controller together with a digital voltage regulation controller, for example, the output current level can be controlled directly by a digital current command generated by the voltage regulator. For phases based on digital voltage mode control, however, a current error can be fed into the voltage regulator to force current sharing.

Control of a DC-DC Converter

Figure 4:
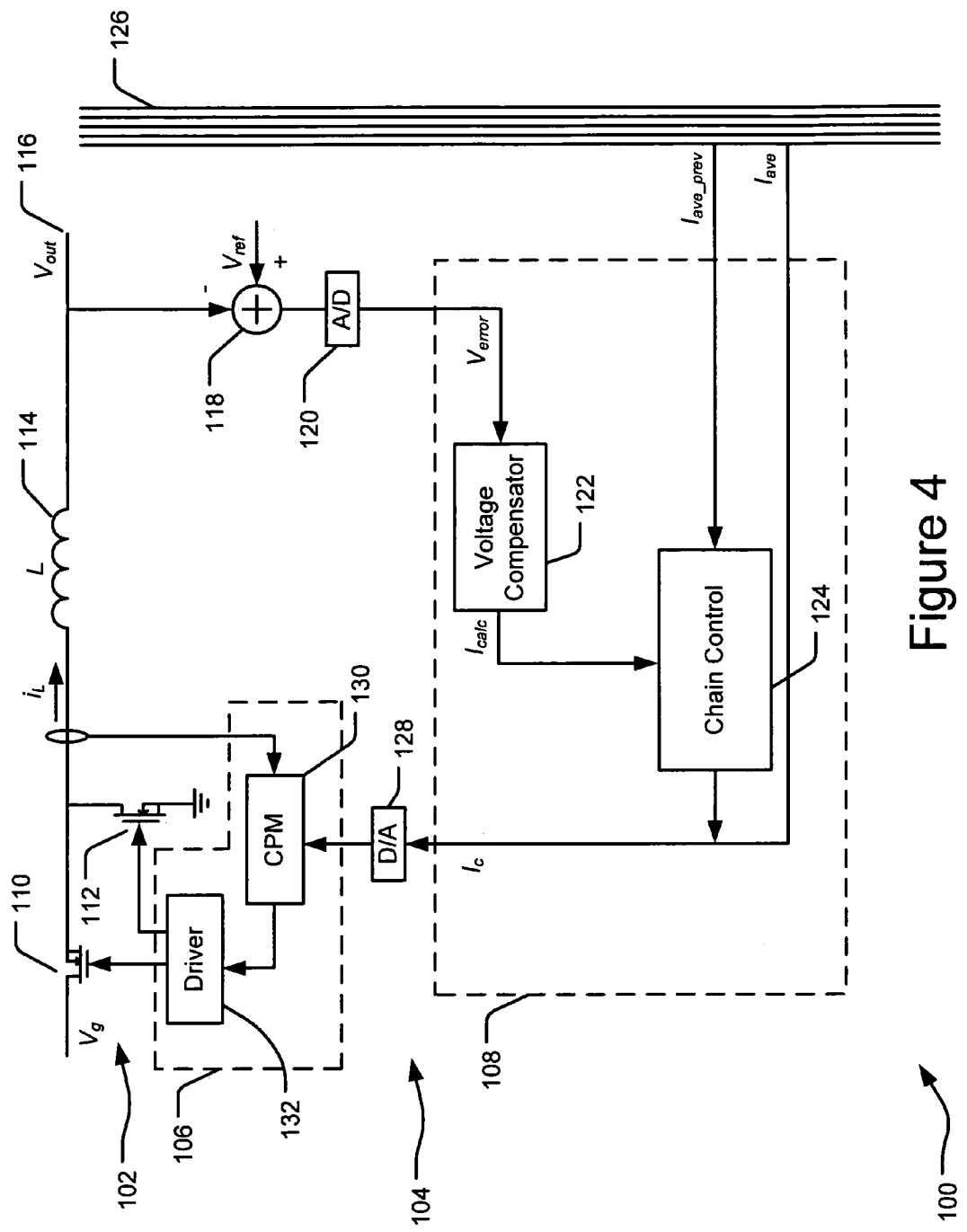
FIG. 4 shows an exemplary embodiment of an individual interleaved phase having a power stage and a chain control current sharing controller for use in a multiphase DC-DC converter.

FIG. 4 shows an embodiment of an individual interleaved phase 100 having a power stage 102 and a chain control current sharing controller 104. The chain control current sharing controller 104 comprises analog current mode control 106 and digital voltage regulation control 108. In this embodiment, the power stage 102 comprises a power switch 110, a synchronous rectifier switch 112, an inductor 114, and an output terminal 116. An output current $i_L$ is measured through the inductor 114, and an output voltage $V_{out}$ is measured at the output terminal 116. The output voltage $V_{out}$ is compared to a reference voltage $V_{ref}$ at a comparator 118 to generate an error signal. This error signal is converted to a digital value $V_{error}$ via an analog-to-digital converter 120. The digital error value $V_{error}$ is then provided to a voltage compensator 122, which calculates an output current level $I_{calc}$ and provides it to a chain controller 124. The chain controller 124, for example, may comprise a digital logic implementation such as that described above with respect to FIG. 3 and/or may comprise a processor operating according to software instructions to determine an updated average current value $I_{ave}$. As described above with respect to FIG. 3, the chain controller receives a previous average current value $I_{ave\_prev}$ determined by a previous individual interleaved phase from the digital data bus 126 and uses that value along with the calculated output current level $I_{calc}$ of the phase to determine the updated average current level $I_{ave}$. The updated average current level $I_{ave}$, or some function of that level, is then converted to an analog signal via a digital-to-analog converter 128 and provided to the analog current mode controller 106. The analog current mode controller 106 also receives the measured output current $i_L$ at the current programmed mode (CPM) modulator 130, which provides a pulse-width-modulated (PWM) signal to a driver 132. The driver 132 controls the power switch 110 and the synchronous rectifier switch 112 of the power stage 102.

Figure 5:
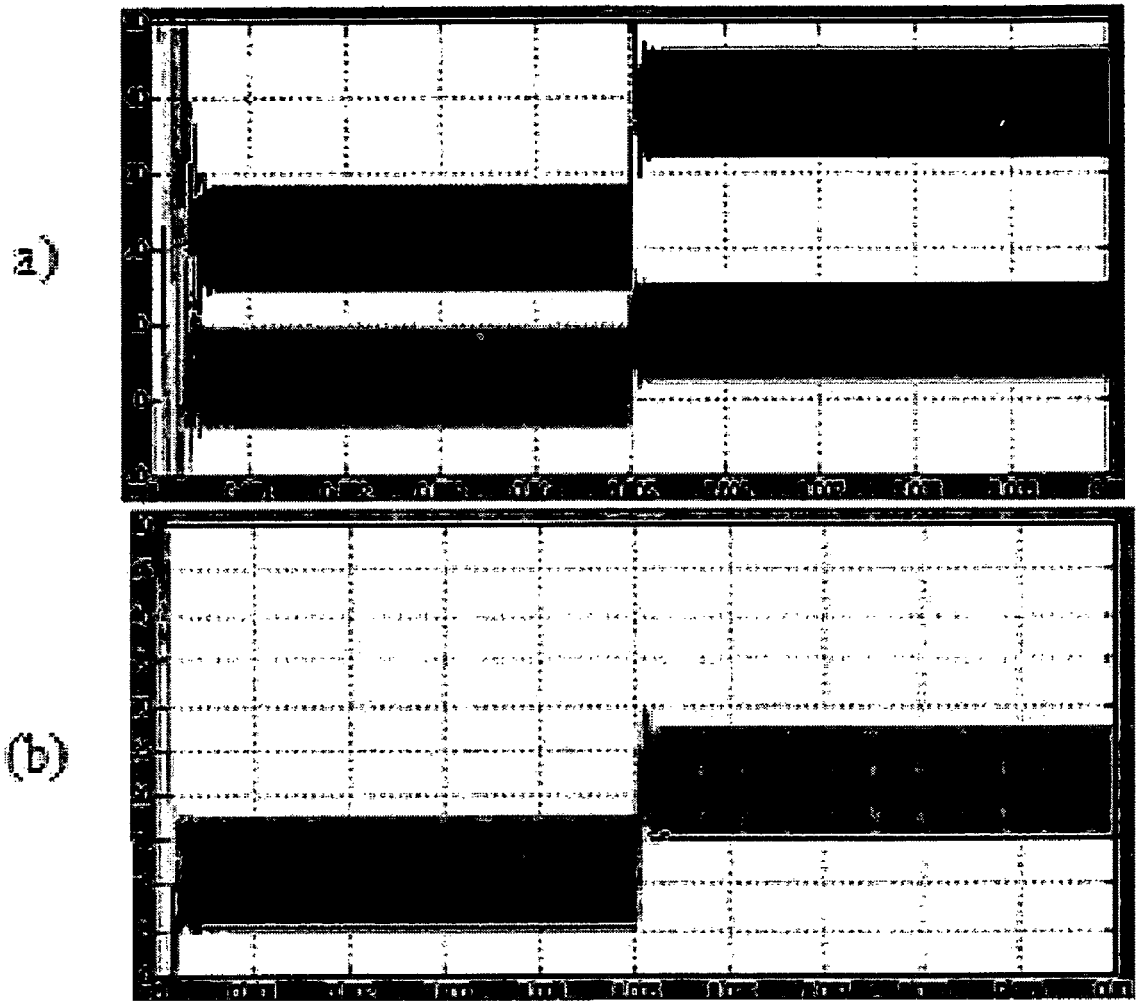
FIGS. 5(a) and 5(b) show simulated output current waveforms for individual phases of a multiphase DC-DC converter without current sharing control and with current sharing control, respectively.

FIG. 5(a) shows simulation results of a current mode controlled two-phase buck converter without the chain control of the controller shown in FIG. 4, while FIG. 5(b) shows simulation results of the same current mode two-phase buck converter with the chain control of the controller shown in FIG. 4. As shown in FIG. 5a, variations in the power stage of the individual interleaved phases 140 and 142 (e.g., due to component variations) result in different output current levels for the power stages of each of the two interleaved phases 140 and 142. In FIG. 5(b), however, the chain control of the controller controls the output current level of the power stages of each of the two individual interleaved phases 140 and 142 to be substantially the same.

Figure 6:
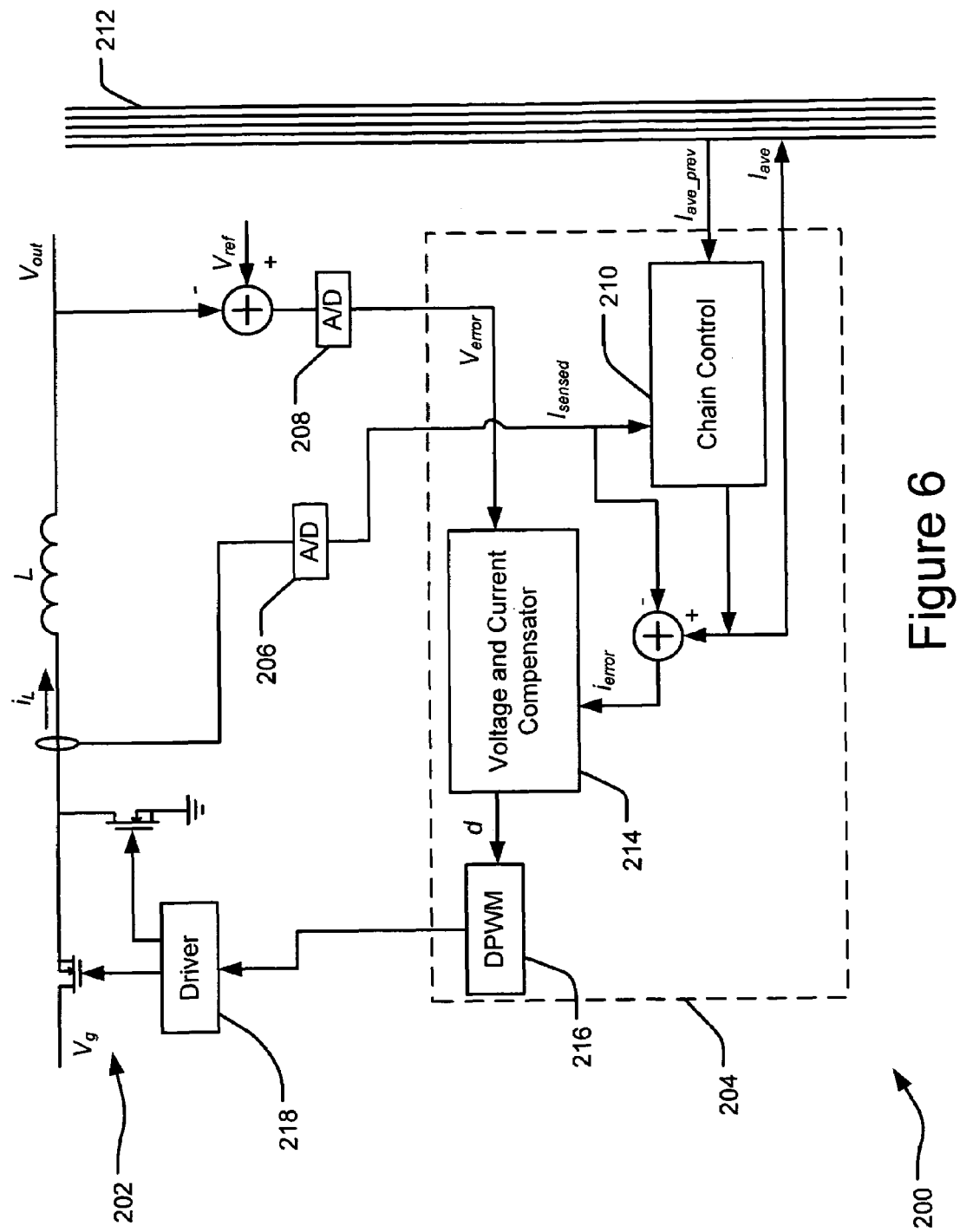
FIG. 6 shows another exemplary embodiment of an individual interleaved phase having a power stage and a chain control current-sharing controller for use in a multiphase DC-DC converter.

FIG. 6 shows an alternative embodiment of an individual interleaved phase 200 having a power stage 202 and a chain control current-sharing controller 204. The power stage 202 is similar to the power stage 102 shown and described above with respect to FIG. 4. The chain control current-sharing controller 204 comprises a digital controller that receives a measured output voltage $V_{out}$ and a measured output current level $i_L$ that is converted to a digital value $I_{sensed}$ by an analog-to-digital converter 206. The output voltage $V_{out}$ is compared to a reference voltage $V_{ref}$ to obtain an analog voltage error signal, which is converted to a digital voltage error level via an analog-to-digital converter 208. The digital output current level $I_{sensed}$ is provided to a chain controller 210. The chain controller 210, for example, may comprise a digital logic implementation such as that described above with respect to FIG. 3 and/or may comprise a processor operating according to software instructions to determine an updated average current value $I_{ave}$. As described above with respect to FIG. 3, the chain controller 210 receives a previous average current value $I_{ave\_prev}$ determined by a previous individual interleaved phase from a digital data bus 212 and uses that value along with the digital output current value $I_{sensed}$ to determine the updated average current level $I_{ave}$. The updated average current level $I_{ave}$, or some function of that level, is then compared to the sensed output current value to obtain a current error signal $i_{error}$ and the current error signal $i_{error}$ is provided to a voltage and current compensator 214. In one embodiment, for example, the current error signal $i_{error}$ may be passed with a gain into a summation node of a discrete-time voltage-loop compensator. The voltage and current compensator 214 also receives the digital voltage error level and determines a duty cycle signal d. The duty cycle signal d is then provided to a digital pulse-width-modulator (DPWM) 216 that provides a pulse-width-modulated signal to a driver 218, which controls a power switch and a synchronous rectifier switch of the power stage 202.

Figure 7:
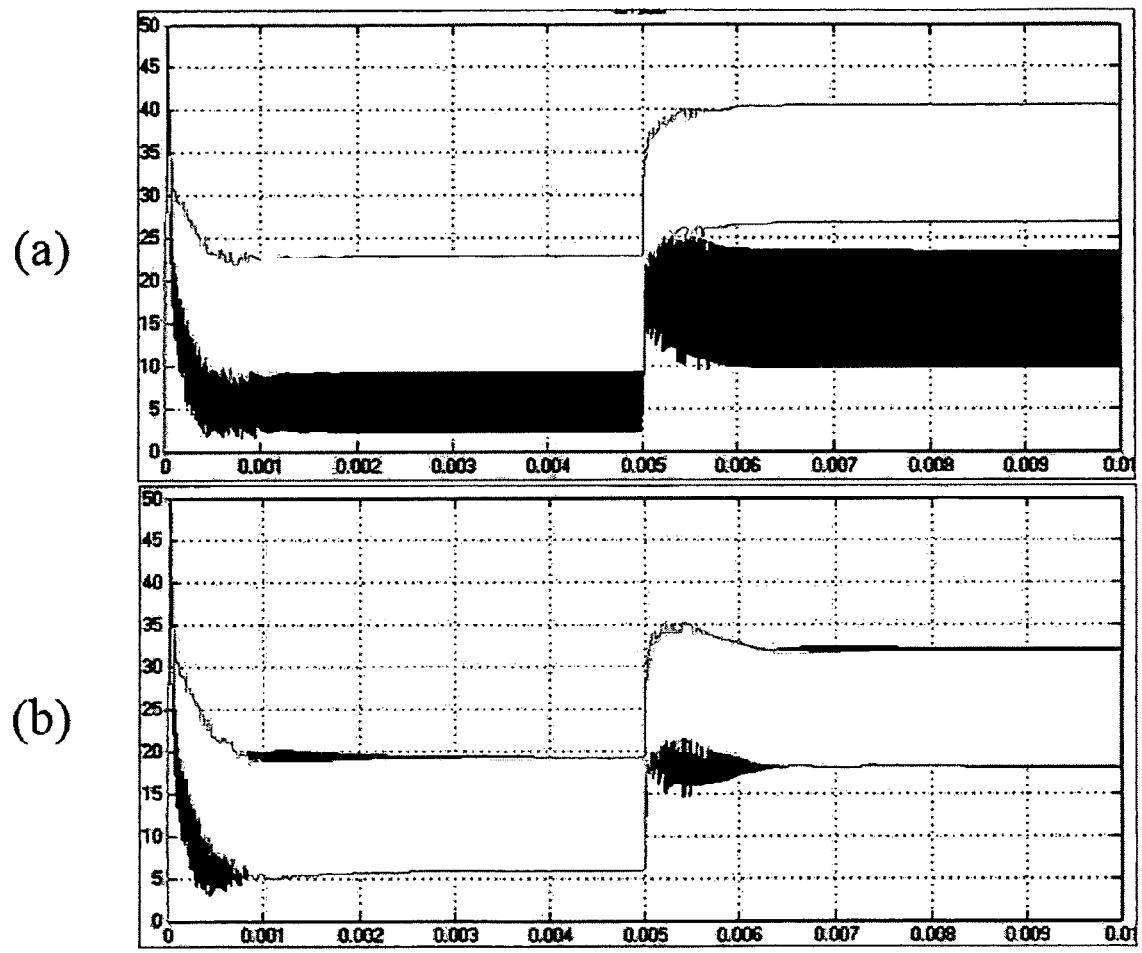
FIGS. 7(a) and 7(b) show simulated output current waveforms for individual phases of a multiphase DC-DC converter without current sharing control and with current sharing control, respectively.

FIG. 7(a) shows simulation results of a voltage mode controlled two-phase buck converter without the chain control of the controller shown in FIG. 6, while FIG. 7(b) shows simulation results of the same voltage mode two-phase buck converter with the chain control of the controller shown in FIG. 6. As shown in FIG. 7(a), variations in the power stage of the individual interleaved phases 220 and 222 (e.g., due to component variations) result in different output current levels for the power stages of each of the two interleaved phases 220 and 222. In FIG. 7(b), however, the chain control of the controller controls the output current level of the power stages of each of the two individual interleaved phases 220 and 222 to be substantially the same.

Figure 8:
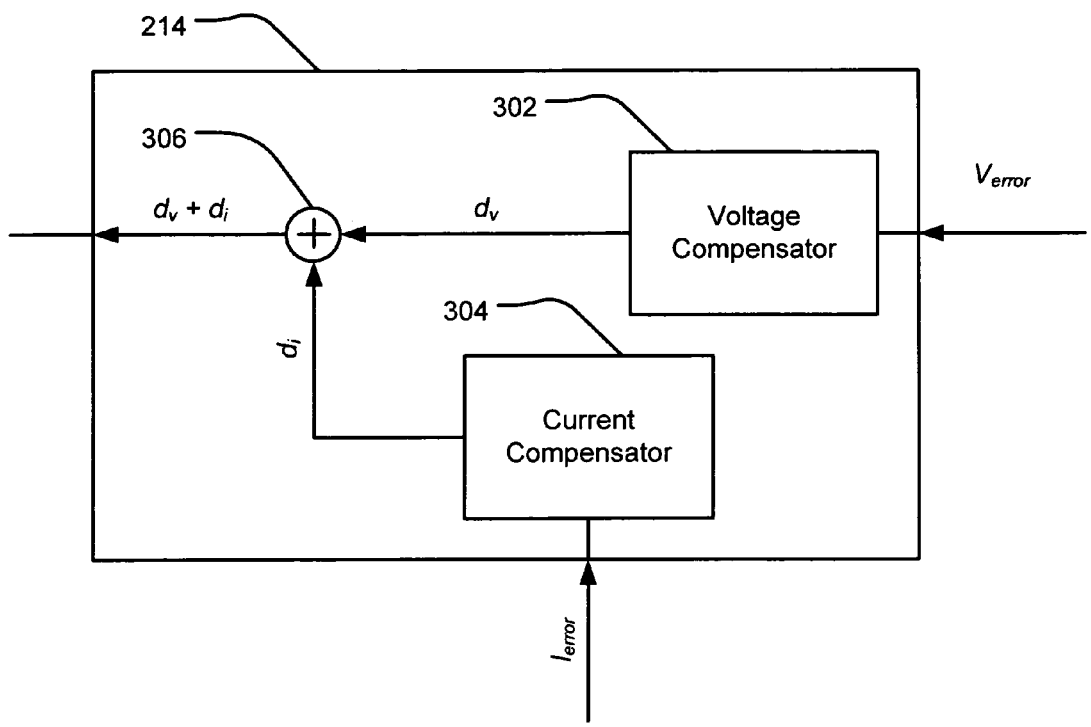
FIG. 8 shows exemplary embodiment of a voltage and current compensator that may be used in the multiphase DC-DC converter shown in FIG. 6.

FIG. 8 shows an exemplary embodiment of a voltage and current compensator that may be used in the masterless multiphase DC-DC converter shown in FIG. 6. In the embodiment of FIG. 8, the voltage and current compensator 214 receives a voltage error signal $v_{error}$ and a current error signal $i_{error}$ as shown in FIGS. 6 and 8. The voltage and current compensator determines a duty cycle command d based upon these input signals. The voltage error signal $v_{error}$ is directed to a voltage compensator 302 that receives the voltage error signal and determines a voltage regulation component $d_v$ for the duty cycle command d. The current error signal $i_{error}$ is directed to a current compensator that receives the current error signal and determines a current-sharing regulation component $d_i$. The voltage regulation component $d_v$ and the current-sharing regulation component $d_i$ are then added together at summing node 306 to determine the duty cycle command d.

The digital controller 204 performs digital voltage regulation, current sharing control, and digital pulse-width-modulation. As shown in FIG. 6, each phase 200 of the converter comprises parallel voltage regulation and current sharing regulation loops. In each phase, the duty cycle command d used to drive the power stage is a function of both the voltage regulation component $d_v$ and a current sharing regulation component $d_i$ (e.g., a sum of the components $d_v+d_i$ as shown in FIG. 8). The voltage regulation component $d_v$ is generated by the voltage regulation loop based on a sensed, calculated, or otherwise determined voltage error, and $d_i$ is generated by the current sharing regulation loop based on a sensed, calculated, or otherwise determined current error. The parallel structure allows both loops to be designed independently and allows for higher bandwidth than is usually available in inner/outer control loops in which the speed of one loop is dependent on the speed of the other loop. However, independence of the loops creates the potential of competition.

Figure 9:
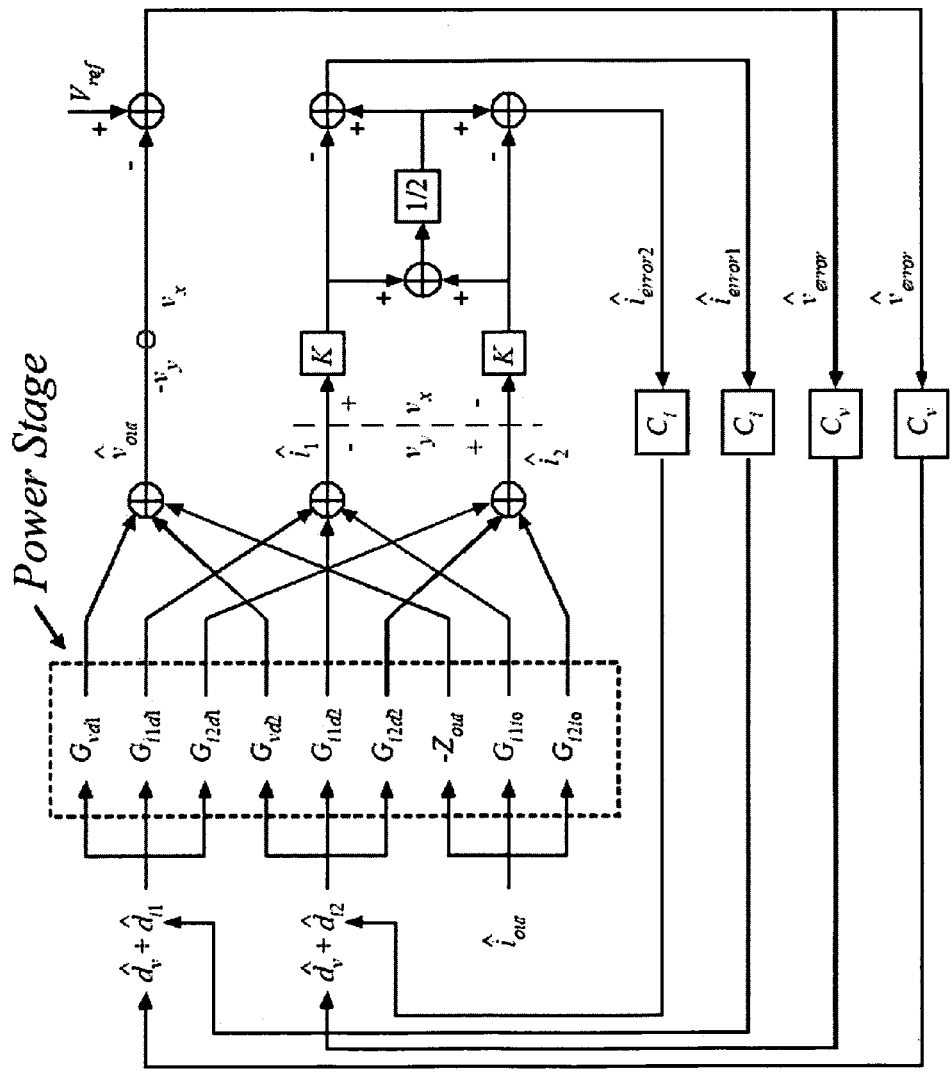
FIG. 9 shows an exemplary system model of the multiphase DC-DC converter shown in FIG. 6 wherein the voltage and current compensator is implemented as shown in FIG. 8.

FIG. 9 shows an exemplary system model of the phase 200 shown in FIG. 6 in which the voltage and current compensator 214 is implemented as shown in FIG. 8. In the system model of FIG. 9, the voltage loop compensator is shown as $C_v$ and the current loop compensator is shown as $C_i$. The power stages are modeled as control-to-output transfer functions. For simplicity, the voltage and current control loops are assumed to be decoupled. First, assuming there are only voltage loops, a loop gain $T_v$ can be obtained by perturbing the inputs of the voltage loops. Second, assuming there are only current loops, a loop gain can be obtained by perturbing the inputs of the current loops. Then, the interactions between the loops are added by perturbing the inputs of the voltage loops and considering the effects of both loops to obtain $T_{sys(v)}$. $T_{sys(i)}$ can be similarly obtained. From the system model of the converter 300 shown in FIG. 9, the transfer functions $T_{sys(v)}$ and $T_{sys(i)}$ are as follows:

$$T_{sys(v)} = \acute{v}_y / \acute{v}_x = T_v - \frac{C_v \cdot ((K/2) \cdot C_i) \cdot (G_{vd1} - G_{vd2}) \cdot (G_{i1d1} - G_{i2d2})}{1 + T_i}$$

and $$T_{sys(i)} = \acute{v}_y / \acute{v}_x = T_i - \frac{C_v \cdot ((K/2) \cdot C_i) \cdot (G_{vd1} - G_{vd2}) \cdot (G_{i1d1} - G_{i2d2})}{1 + T_v}.$$

If the two power stages are identical, $G_{vd1}=G_{vd2}$, then $T_{sys(v)}=T_v$ and $T_{sys(i)}=T_i$. Thus, if there are no mismatches between the power stages, the voltage regulation loops and current sharing loops are decoupled. The voltage loop compensator and the current loop compensator can be designed separately based on $T_v$ and $T_i$. $T_{sys(v)}$ and $T_{sys(i)}$ can be used to verify the system stability and performance due to power stage mismatches.

Figure 10:
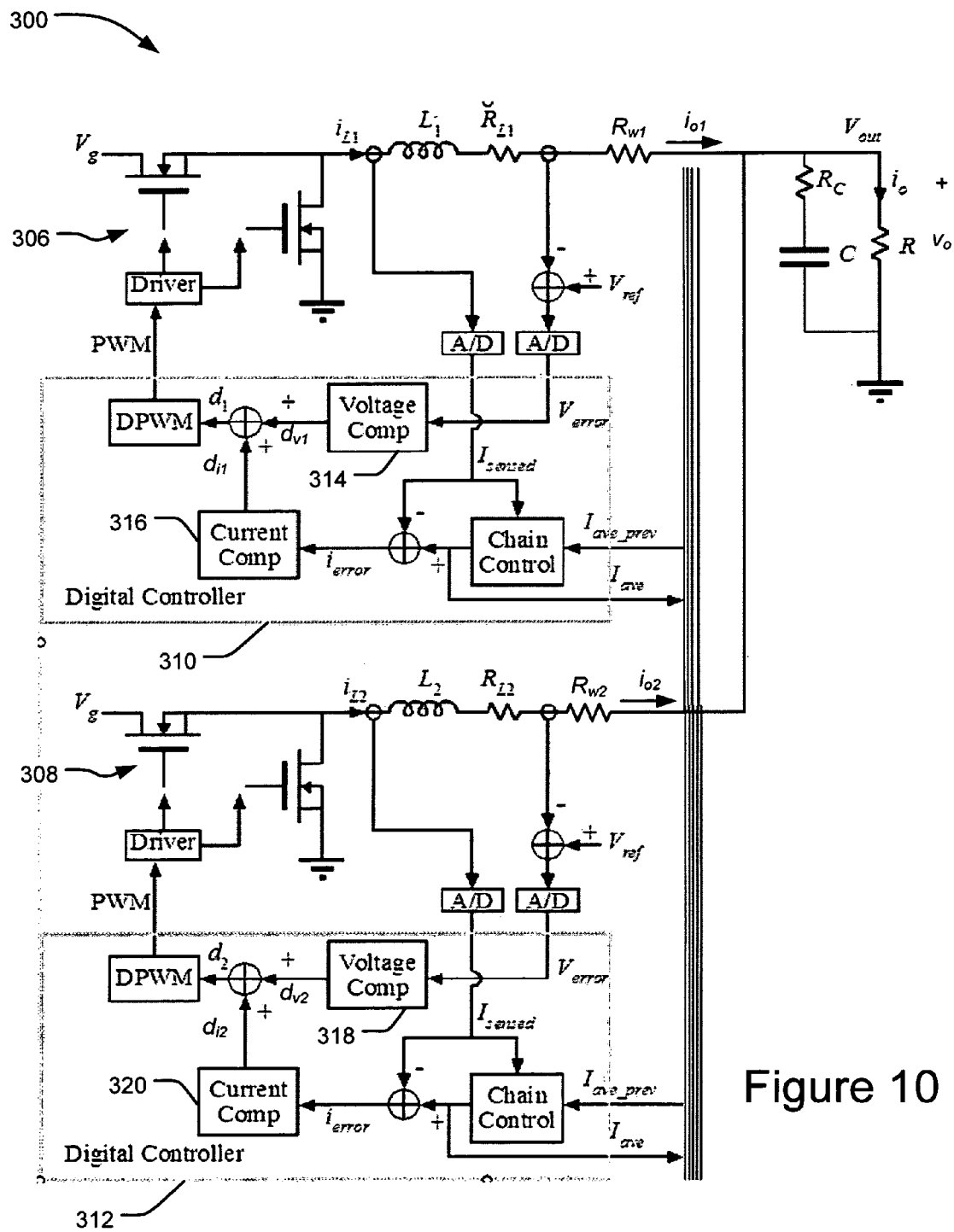
FIG. 10 shows another exemplary embodiment of a multiphase DC-DC converter.

FIG. 10 shows another exemplary embodiment of a two-phase DC-DC converter 300 in which each phase corresponds to the phase shown in FIG. 8 in which the voltage and current compensator comprises the compensator shown in FIG. 8. Each phase 302 and 304 comprises a DC-DC converter 306, 308 and a digital controller 310, 312, respectively. As described above, the digital controller 310 of the first phase receives a voltage error signal $V_{error1}$ at a voltage compensator 314 and a current error signal $i_{error1}$ at a current compensator 316. The digital controller 312 of the second phase receives a voltage error signal $V_{error2}$ at a voltage compensator 318 and a current error signal $i_{error2}$ at a current compensator 320. The voltage compensators 314 and 318 determine voltage regulation duty cycle components $d_{v1}$ and $d_{v2}$, and the current compensators 316 and 320 provide current-sharing regulation components $d_{i1}$ and $d_{i2}$, respectively. The first controller 310 determines a first duty cycle command $d_1$ by summing the voltage regulation component $d_{v1}$ with the current-sharing regulation component $d_{i1}$. Similarly, the second controller 312 determines a second duty cycle command $d_2$ by summing the voltage regulation component $d_{v2}$ with the current-sharing regulation component $d_{i2}$. The controllers 310 and 312 then use these duty cycle commands $d_1$ and $d_2$ to generate a pulse-width-modulated signal used to drive power switches of the converters 306 and 308.

Figure 11:
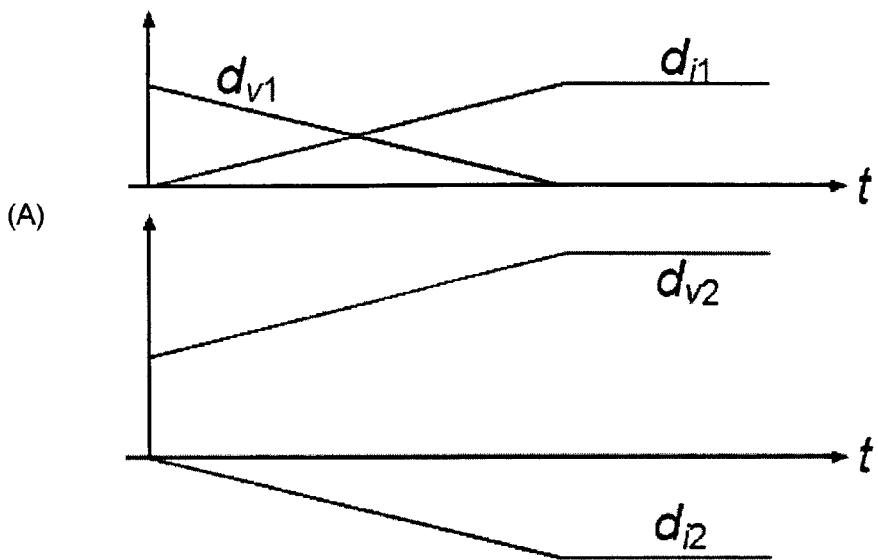
FIGS. 11(a) and 11(b) show theoretical and simulation results, respectively, of the DC-DC converter of FIG. 9.
Figure 11:
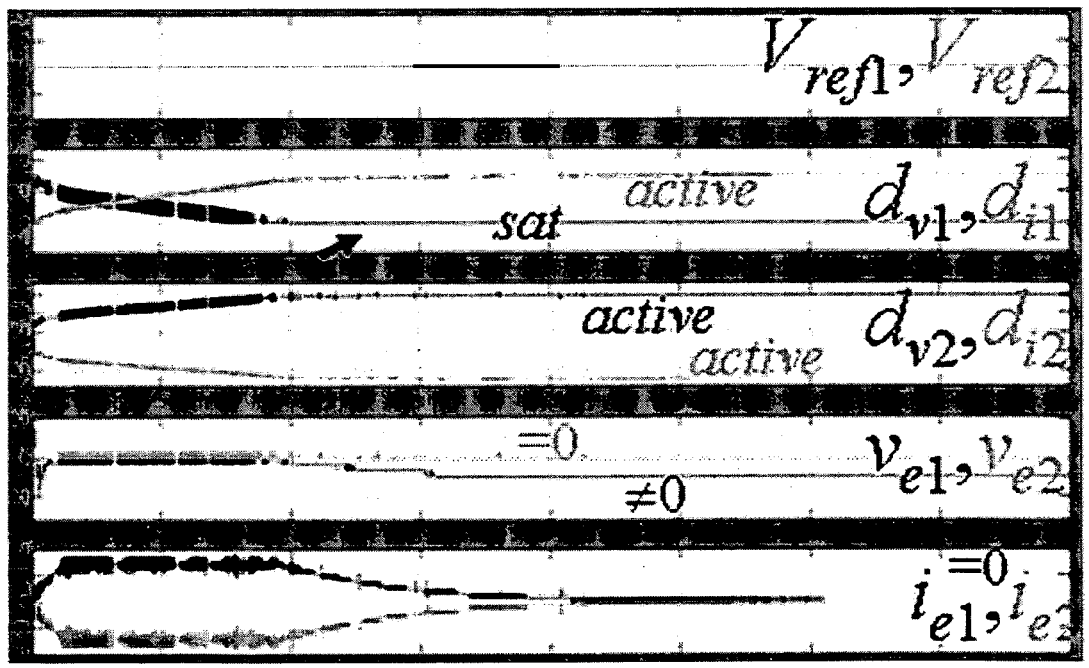

In the converter 300, voltage loops sense voltages at the outputs of each phase independently ($v_{c1}$ and $v_{c2}$) and compare them to voltage references $V_{ref1}$ and $V_{ref2}$ (e.g., on-board voltage references). Differences in the reference voltages and in physical sensing points (e.g., wire resistances to load) can cause voltage sensing errors among phases. If both voltage regulation loops are working actively, the sensed voltages of each phase $v_{c1}$ and $v_{c2}$ should be at least substantially equal to $V_{ref1}$ and $V_{ref2}$, respectively (e.g., $v_{c1}=V_{ref1}$ and $v_{c2}=V_{ref2}$). If the current sharing regulation loops are working actively, the inductor currents of each phase $i_{L1}$ and $i_{L2}$ should be at least substantially equal to each other (e.g., $i_{L1}=i_{L2}$ and $i_{o1}=i_{o2}$) in steady-state conditions (e.g., DC). From FIG. 10, it can be seen that $v_{c1}=R_{w1} \cdot i_{o1}+v_o$ and $v_{c2}=R_{w2} \cdot i_{o2}+v_o$. If $V_{ref1} \neq V_{ref2}$ or $R_{w1} \neq R_{w2}$, then $v_{c1}=V_{ref1}$, $v_{c2}=V_{ref2}$, and $i_{o1}=i_{o2}$ cannot be satisfied at the same time. This will result in "competition" between the voltage and current loops. Since there is no steady-state operation point in which all loops are active, competition will continue until one or more loops become saturated as shown in FIG. 11. FIG. 11(a), for example, shows a theoretical example of waveforms for $d_{v1}$ and $d_{i1}$ of the first phase and $d_{v2}$ and $d_{i2}$ for the second phase.

FIG. 11(b) further shows simulated waveforms for the same waveforms for the DC-DC converter shown in FIG. 10. In FIG. 11(b), the non-ideal conditions (mismatched phases) are simulated by assigning different wire resistances of $R_{w1}=5$ mΩ and $R_{w2}=1$ mΩ, while reference voltages are identical and the total load current is 30 amps. The voltage loops and current loops in the two phases start to compete from start-up (i.e., one keeps increasing and the other keeps decreasing) until the voltage loop in phase 1 goes to saturation and loses control.

Problems that may be induced by voltage sensing errors include: (i) control loops going into saturation and staying in saturation without recovery; and (ii) there is no DC operation point to allow all loops to remain active. These problems, however, can be corrected by implementing control techniques.

Figure 12:
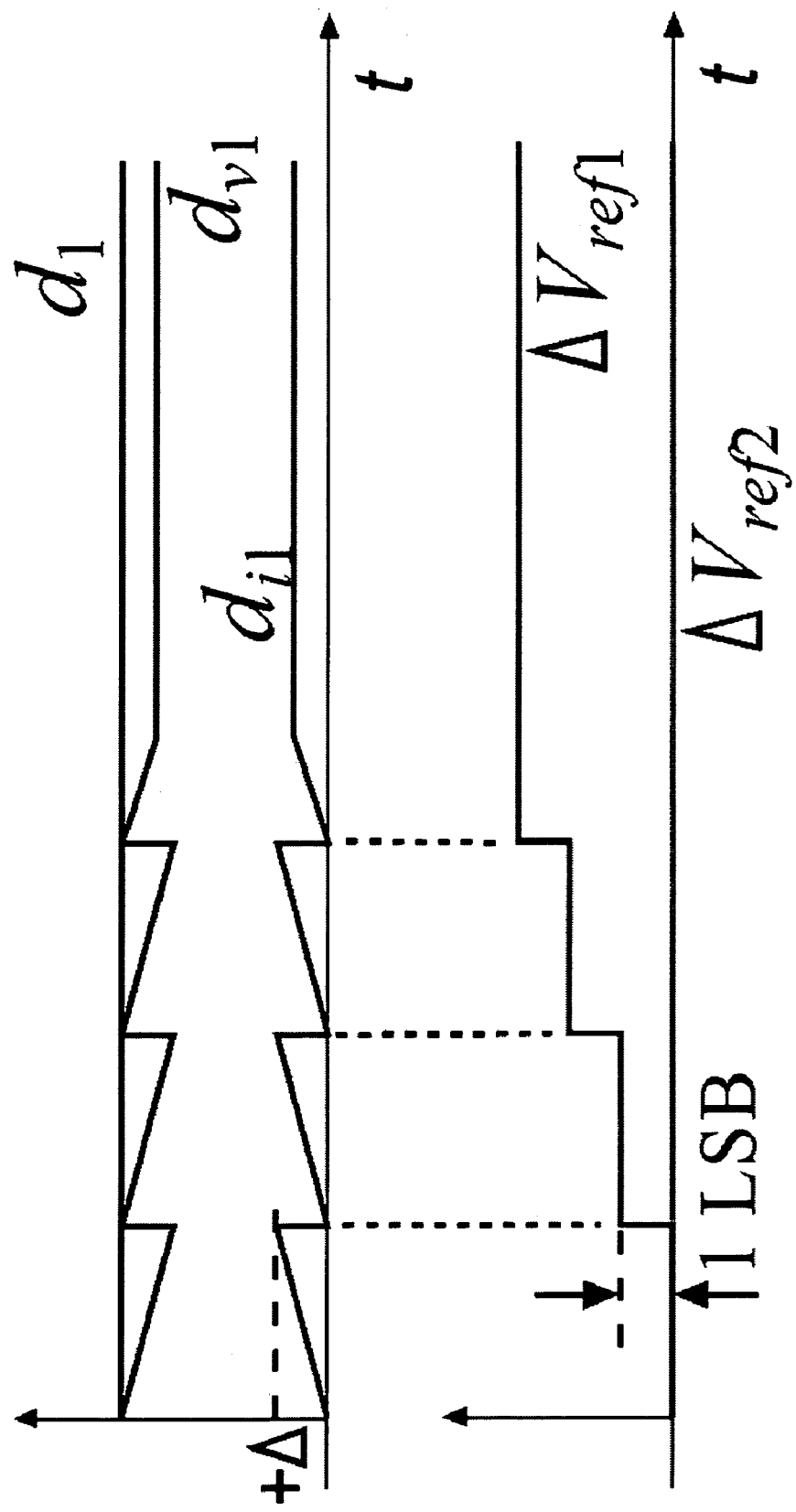
FIG. 12 shows exemplary waveforms of voltage regulation and current-sharing regulation duty cycle components according to an exemplary control technique.

In one implementation, for example, saturation control can be utilized to keep voltage and current loops from saturation. In this implementation, fast regulation speed may still be maintained. Without competition, the duty cycle component $d_i$ of the current sharing regulation loop is usually small, and the duty cycle component $d_v$ of the voltage regulation loop is usually dominant. The duty cycle components $d_i$ and $d_v$ are internal variables of the digital controller and are invisible to the power stage. Only the sum of both components $d=d_i+d_v$ is used to drive the power stage operation. For saturation control, a boundary of $\pm\Delta$ is set to the duty cycle command $d_1$ as shown in FIG. 12. If $d_{i1}$ goes outside of (or equals) this boundary $d_{i1}$ can be adjusted back to zero (or to some other value within the boundary) and at the same time adjust $d_{v1}$ can be adjusted by the same amount in the opposite direction to keep the sum d unchanged. Thus, the operation of the power stage will not be affected by the adjustment (since the sum d remains the same) and both loops will never go into saturation.

Figure 13:
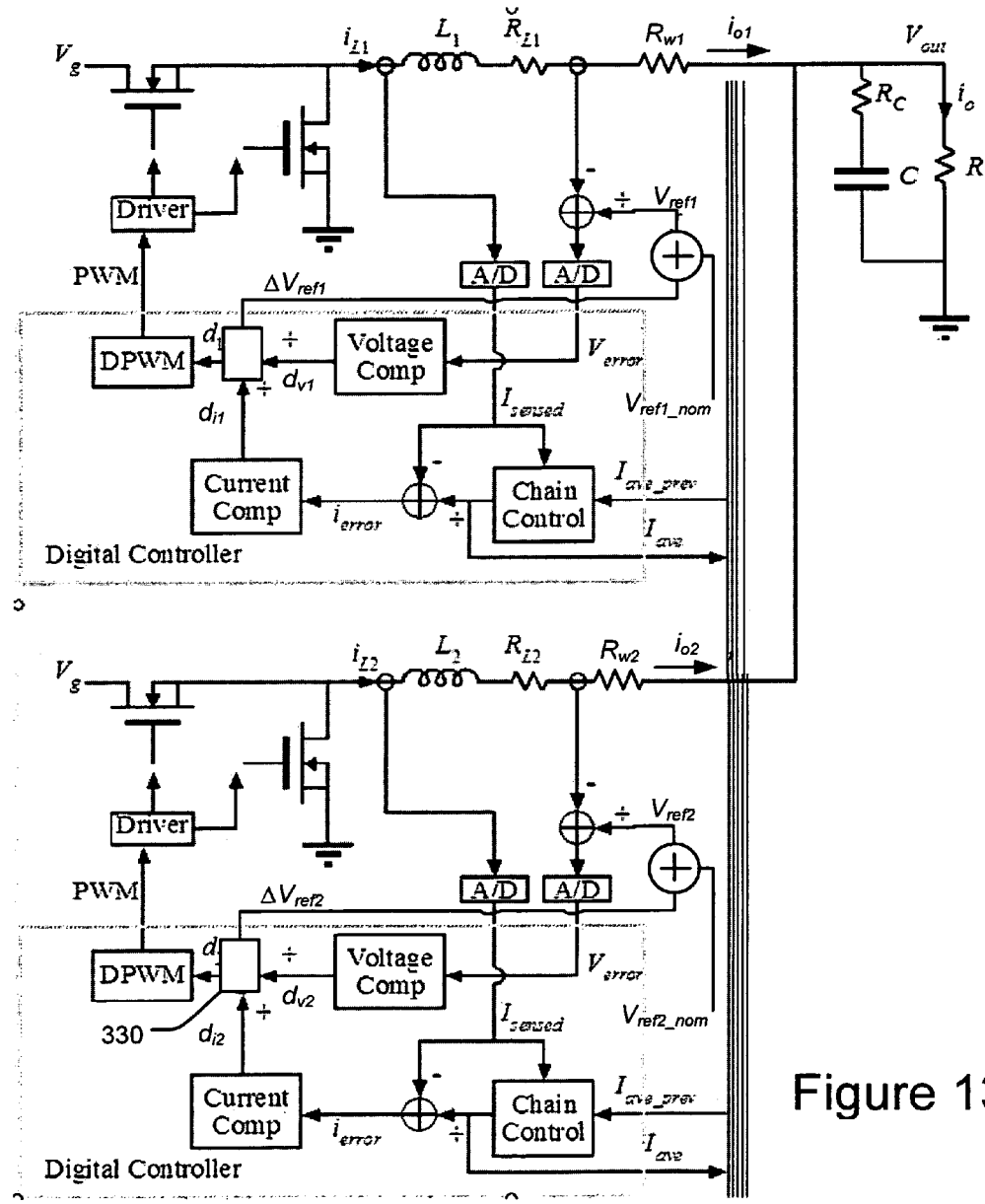
FIG. 13 shows another exemplary embodiment of a multiphase DC-DC converter.

In another implementation as shown in FIG. 13, at least one voltage reference $V_{ref2}$ level is adaptively controlled to find a steady-state operating point at which all phases may be maintained active. With a given $R_{w1}$, $R_{w2}$, and $V_{ref1}$, a value of $V_{ref2\_nom}$ can be found that allows $v_{c1}=V_{ref1}$, $v_{c2}=V_{ref2}$, and $i_{o1}=i_{o2}$ at the same time such that each loop can remain active during steady-state conditions. A search algorithm, for example, may be used to find a stable reference value adaptively. In a multiphase system, at least one voltage reference value (e.g., $V_{ref1}$) can be arbitrarily selected to remain constant while the remaining phases are allowed to digitally adjust their reference voltages to reach stable values. A Saturation and $V_{ref}$ Control unit 330, for example, may receive the voltage regulation duty cycle component $d_{v2}$ and the current-sharing regulation duty cycle component $d_{i2}$ and provide a duty cycle command d, such as described above with respect to FIG. 10. In addition, each phase comprises a Saturation and $V_{ref}$ Control unit 330 and 332, respectively, that further provides a reference voltage adjustment value $\Delta V_{ref1}$ and $\Delta V_{ref2}$. The Saturation and $V_{ref}$ Control unit 332, for example, determines a reference voltage adjustment value $\Delta V_{ref2}$ for the second phase. The reference voltage adjustment value $\Delta V_{ref2}$ is provided to a summing node along with a nominal reference voltage $V_{ref2\_nom}$ to determine the reference voltage value $V_{ref2}$ that is then used as the reference voltage for the phase.

Where $d_i$ goes outside of a boundary, as described above, it can be treated as a sign of competition among the loops. If the duty cycle component $d_i$ of a current sharing regulation loop goes beyond a boundary once, a $\Delta V_{ref}$ for this phase can be adjusted once by one step. This continues until a steady state operation point is found. Then, each of the voltage and current loops can be active during steady-state conditions without competition.

Figure 14:
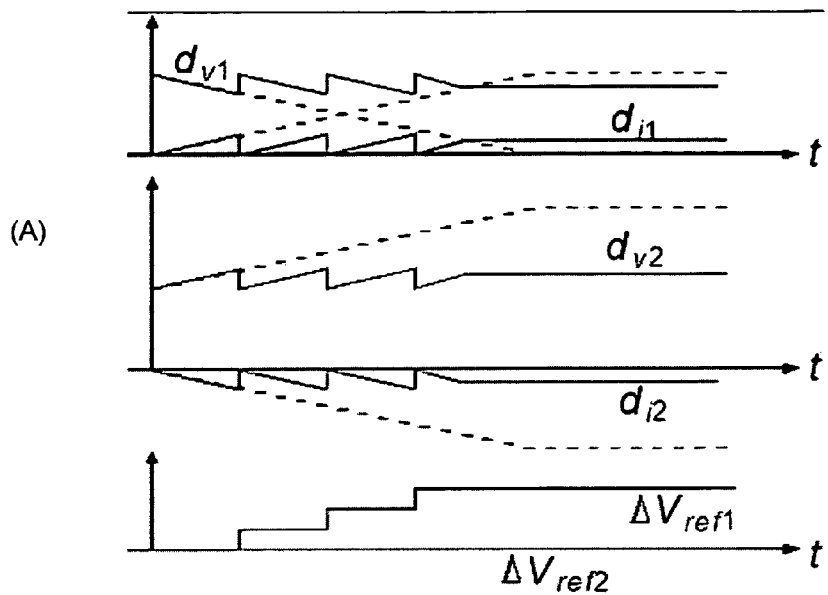
FIGS. 14(a) and 14(b) show theoretical and simulation results, respectively, of the DC-DC converter of FIG. 13 using an exemplary control technique.
Figure 14:
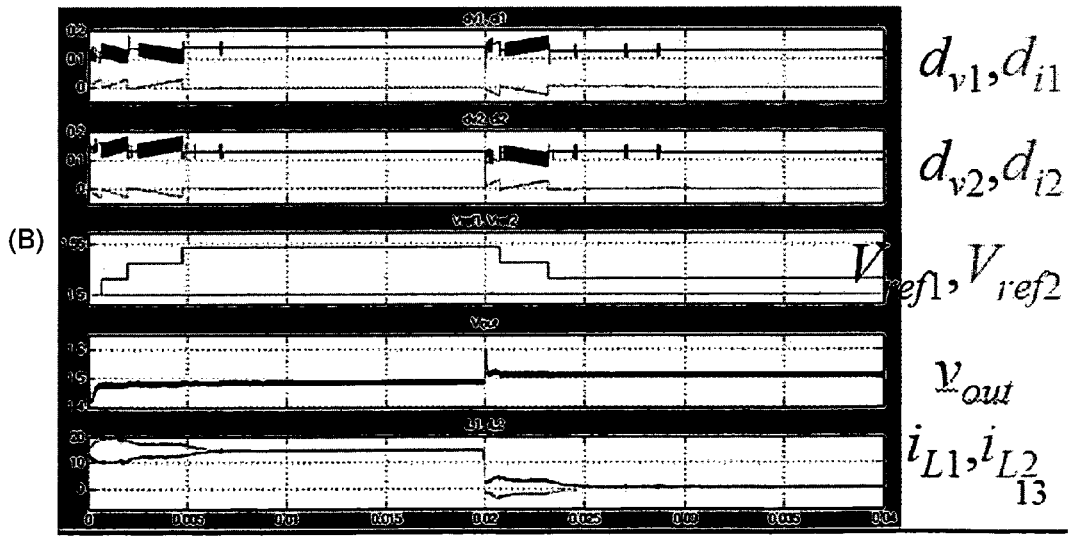

FIGS. 14(a) and 14(b) show theoretical and simulation results, respectively, of the DC-DC converter of FIG. 13 utilizing this control approach. In FIG. 14(b), the simulation was performed for the converter of FIG. 13 in which the following conditions were assumed: different wire resistances of $R_{w1}=5$ mΩ and $R_{w2}=1$ mΩ, the reference voltages are identical, and the total load current was 30 amps. $V_{ref2}$ is maintained constant, and $V_{ref1}$ is adjusted adaptively. Saturation control prevents the voltage regulation loops from saturating and after a few steps of $V_{ref1}$ adjustment, a steady-state operating condition is found in which all loops are active. Each loop stays stable and active after that for both steady-state and transient conditions.

Current Sensing

The output current of a power stage of each individual interleaved phase may be sensed via any method known in the art. For example, an accurate sense resistor $R_s$ may be added and the voltage across the resistor measured to determine the current; a voltage across a parasitic resistance of a component of the power stage (e.g., $R_{on}$ of the power MOSFET of a power stage, an inductor series resistance $R_L$, or a PCB trace resistance $R_W$) may be sensed and used to determine the current; a current-sensing power MOSFET "SenseFet" (SFET) or a current transformer CT may be used; or "lossless" methods based on existing parasitic values (e.g., $R_{on}$, $R_L$, or $R_W$). In one embodiment, for example, a calibration of the current sensing can be performed as described in Y. Zhang; R. Zane, A. Prodic, R. Erickson, D. Maksimovic, "Online calibration of MOSFET on-state resistance for precise current sensing," IEE Power Electronics Letters, IEEE, Volume 2, Issue 3, Sept. 2004, pages 100-03, which is herein incorporated by reference in its entirety.

Although several embodiments of this invention have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A converter module for use as a phase in a multiphase DC-DC converter having a data bus for transferring current-sharing information, the converter module comprising:
    a power stage comprising an input for receiving an input voltage and an output for providing an output voltage and an output current;
    a chain controller coupled to said power stage to receive a feedback signal from said power stage and comprising a data bus port configured to receive the current-sharing information from the data bus and provide updated current-sharing information to the data bus, said chain controller being configured to:
        determine a current level being provided by said power stage,
        update the current-sharing information based upon the determined current level,
        determine a current error based upon the determined current level and the updated current-sharing information,
        control an operation of said power stage based upon the current error, and
        provide the updated current-sharing information to the data bus.

2. The converter module of claim 1 wherein said chain controller comprises an analog current-mode controller and a digital voltage regulation controller.

3. The converter module of claim 2 wherein said analog current mode controller of said chain controller comprises a current programmed mode (CPM) modulator.

4. The converter module of claim 1 wherein said chain controller comprises a digital voltage-mode controller.

5. The converter module of claim 1 wherein said feedback signal from said power stage comprises a current level corresponding to said power stage.

6. The converter module of claim 1 wherein said chain controller further comprises a compensator that is configured to provide a duty cycle command based upon at least a voltage error signal and a current error signal.

7. The converter module of claim 1 wherein said chain controller comprises a current-mode controller and chain current sharing controller.

8. The converter module of claim 1 further comprising:
    a second power stage comprising a second input for receiving a second input voltage and a second output for providing a second output voltage and a second output current, wherein said second power stage is disposed in parallel with said power stage;
    a data bus coupled to said controller;
    a second chain controller coupled to said second power stage to receive a feedback signal from said second power stage and comprising a second data bus port coupled to said data bus and configured to receive the updated current-sharing information from the data bus and provide a second updated current-sharing information to the data bus, said second chain controller being configured to:
        determine a second current level being provided by said second power stage,
        update the updated current-sharing information based upon the determined second current level to obtain a second updated current-sharing information,
        determine a current error based upon the determined second current level and the second updated current-sharing information,
        control an operation of said power stage based upon the current error, and
        provide the second updated current-sharing information to the data bus.

9. The converter module of claim 8 wherein said power stage and said second power stage comprise interleaved phases of a multiphase DC-DC power converter.

10. The converter module of claim 8 further comprising an output capacitor disposed in parallel with said output of said power stage, said second output of said second power stage, and a pair of output terminals of the converter module.

11. The converter module of claim 8 wherein the second updated current-sharing information comprises collective current-sharing information of the determined current level of said power stage and the determined second current level of said second power stage.

12. The converter module of claim 11 wherein the second updated current-sharing information comprises a function of an average comprising at least the determined current level of said power stage and the determined second current level of said second power stage.

13. The converter module of claim 8 wherein the second updated current-sharing information comprises individual current-sharing information of the determined second current level of said second power stage.

14. The converter module of claim 1 wherein the chain controller is configured to update the current-sharing information via a moving-window average function.

15. The converter module of claim 14 wherein the moving-window average function comprises $I_{ave}[i]=I_{ave\_prev}-I[i][n-1]/N+I[i][n]/N$, wherein $I_{ave\_prev}$ comprises an average current level determined by a previous phase.

16. The converter module of claim 1 wherein the updated current-sharing information comprises a function of the determined current level of the power stage.

17. The converter module of claim 1 wherein the updated current-sharing information comprises collective current-sharing information comprising a function of the determined current level of said power stage and current information of a second power stage.

18. The converter module of claim 16 wherein the updated current-sharing information comprises a function of an average comprising at least the determined current level of said power stage and the current information of said second power stage.

19. The converter module of claim 1 wherein the updated current-sharing information comprises individual current-sharing information of the determined current level of said power stage.

20. The converter module of claim 1 wherein said chain controller comprises a voltage regulation loop in parallel with a current-sharing regulation loop.

21. The converter module of claim 20 wherein said chain controller is configured to utilize a saturation control to prevent said voltage regulation loop and said current-sharing regulation loop from entering saturation.

22. The converter module of claim 20 wherein said chain controller is configured to adaptively control at least one voltage reference level to maintain said voltage regulation loop and said current-sharing regulation loop active.

23. The converter module of claim 22 wherein said chain controller is configured to utilize a search algorithm to adaptively determine a stable reference voltage.

24. The converter module of claim 1 wherein said chain controller is configured to determine a duty cycle command for use in controlling an operation of said power stage, the duty cycle command comprising a voltage regulation component and a current-sharing regulation component, wherein, if the current-sharing regulation component exceeds a boundary, then the current-sharing regulation component and the voltage regulation component are adjusted by equal and opposite incremental amounts.

25. The converter module of claim 24 wherein, when the current-sharing regulation component exceeds the boundary, a reference voltage is incrementally adjusted.

26. The converter module of claim 1 wherein said power stage comprises at least one of the group comprising a buck power converter, a boost power converter, a boost-buck power converter, an inverting power converter, a half-bridge switching power converter, a full-bridge switching power converter, a multi-level switching power converter, and an isolated power converter.

27. A multiphase DC-DC power converter comprising:
a first phase comprising a first power stage and a first chain controller configured to control an operation of the first power stage;
a second phase comprising a second power stage and a second chain controller configured to control an operation of the second power stage; and
a data bus coupled to the first controller and the second controller,
wherein the first chain controller is further configured to receive a first current-sharing information via the data bus, update the first current-sharing information to obtain a second current-sharing information, and provide the second current-sharing information to the data bus, and
wherein the second chain controller is further configured to receive the second current-sharing information from the data bus, to update the second current-sharing information to obtain a third current-sharing information, and to provide the third current-sharing information to the data bus.

28. The power converter of claim 27 wherein the first chain controller comprises an analog current mode controller and a digital voltage regulation controller.

29. The converter module of claim 28 wherein the first analog current mode controller of the first chain controller comprises a current programmed mode (CPM) modulator.

30. The converter module of claim 27 wherein the first chain controller comprises a digital voltage-mode controller.

31. The converter module of claim 27 wherein the first chain controller is further configured to receive a first current level corresponding to the first power stage, the first chain controller further configured to update the first current-sharing information using the first current level.

32. The converter module of claim 31 wherein the first chain controller further comprises a compensator that is configured to provide a duty cycle command based upon at least a voltage error signal and a current error signal.

33. The converter module of claim 27 wherein the first chain controller comprises a current-mode control and chain current sharing control.

34. The power converter of claim 27 wherein the first phase and the second phase comprise interleaved phases.

35. The power converter of claim 27 further comprising an output capacitor disposed in parallel with the first power stage, the second power stage, and a pair of output terminals of the power converter.

36. The power converter of claim 27 wherein the third current-sharing information comprises collective current-sharing information of a first current level of the first power stage and a second current level of the second power stage.

37. The power converter of claim 36 wherein the third current-sharing information comprises a function of an average comprising at least the first current level and the second current level.

38. The power converter of claim 27 wherein the second current-sharing information comprises individual current-sharing information of a first current level of the first power stage.

39. The power converter of claim 27 wherein the first chain controller is configured to update the first current-sharing information via a moving-window average function.

40. The power converter of claim 39 wherein the moving-window average function comprises $I_{ave}[i]=I_{ave\_prev}-I[i][n-1]/N+I[i][n]/N$, wherein $I_{ave\_prev}$ comprises an average current level determined by a previous phase.

41. The power converter of claim 27 wherein the second current-sharing information comprises a function of a current level of the first power stage.

42. The power converter of claim 27 wherein the third current-sharing information comprises collective current-sharing information comprising a function of a first current level of the first power stage and a second current level of the second power stage.

43. The power converter of claim 42 wherein the third current-sharing information comprises a function of an average comprising at least the first current level and the second current level.

44. The power converter of claim 27 wherein the third current-sharing information comprises individual current-sharing information of a second current level of the second power stage.

45. The power converter of claim 27 wherein the first chain controller comprises a voltage regulation loop in parallel with a current-sharing regulation loop.

46. The power converter of claim 45 wherein the first chain controller is configured to utilize a saturation control to prevent the voltage regulation loop and the current-sharing regulation loop from entering saturation.

47. The power converter of claim 46 wherein the first chain controller is configured to adaptively control at least one voltage reference level to maintain the voltage regulation loop and the current-sharing regulation loop active.

48. The power converter of claim 47 wherein the first chain controller is configured to utilize a search algorithm to adaptively determine a stable reference voltage.

49. The power converter of claim 27 wherein said first chain controller is configured to determine a duty cycle command for use in controlling an operation of said power stage, the duty cycle command comprising a voltage regulation component and a current-sharing regulation component, wherein, if the current-sharing regulation component exceeds a boundary, then the current-sharing regulation component and the voltage regulation component are adjusted by equal and opposite incremental amounts.

50. The converter module of claim 49 wherein, when the current-sharing regulation component exceeds the boundary, a reference voltage is incrementally adjusted.

51. A chain control method of sharing current information between phases of a multiphase DC-DC converter, the chain control method comprising:
  receiving a first current-sharing information at a first phase via a data bus;
  updating the first current-sharing information at the first phase based upon current information of the first phase to obtain a second current-sharing information;
  providing the second current-sharing information to the data bus;
  receiving the second current-sharing information at a second phase via the data bus;
  updating the second current-sharing information at the second phase based upon current information of the second phase to obtain a third current-sharing information; and
  providing the second current-sharing information to the data bus.

52. The method of claim 51 wherein the third current-sharing information comprises collective current-sharing information of the first phase and the second phase.

53. The method of claim 52 wherein the third current-sharing information comprises a function of an average comprising at least a first current level of the first phase and a second current level of the second phase.

54. The method of claim 51 wherein the second current-sharing information comprises individual current-sharing information of a first current level of the first phase.

55. The method of claim 51 wherein the operation of updating the second current sharing information comprises utilizing a moving-window average function.

56. The method of claim 55 wherein the moving-window average function comprises $I_{ave}[i]=I_{ave\_prev}-I[i][n-1]/N+I[i][n]/N$, wherein $I_{ave\_prev}$ comprises an average current level determined by the first phase.

57. The method of claim 56 wherein $I_{ave\_prev}$ comprises the second current-sharing information.

58. The method of claim 51 wherein the operation of updating the second current sharing information comprises utilizing a chain control algorithm.

59. The method of claim 51 wherein the second current-sharing information comprises a function of a first current level of the first phase.

60. The method of claim 51 wherein third updated current-sharing information comprises collective current-sharing information comprising a function of a first current level of the first phase and a second current level of the second phase.

61. The method of claim 60 wherein the third current-sharing information comprises a function of an average comprising at least the first current level and the second current level.

62. The method of claim 51 wherein the third current-sharing information comprises individual current-sharing information of a second current level of the second phase.

* * * * *